United States Patent [19]
Liu et al.

[11] Patent Number: 6,164,191
[45] Date of Patent: Dec. 26, 2000

[54] SINGLE SERVING BEVERAGE MAKER

[75] Inventors: Yiu C. Liu, Lake Oswego, Oreg.; Frederick A. Loso, Minneapolis, Minn.

[73] Assignee: Pacific Cornetta Inc., Wilsonville, Oreg.

[21] Appl. No.: 09/326,087

[22] Filed: Jun. 4, 1999

[51] Int. Cl.[7] .................................................. A47J 31/10
[52] U.S. Cl. ................................ 99/305; 99/285; 99/299
[58] Field of Search ............................ 99/299, 305, 286, 99/304, 307, 285, 282

[56] References Cited

U.S. PATENT DOCUMENTS

| | | | |
|---|---|---|---|
| 2,767,640 | 10/1956 | Holland | 99/305 X |
| 4,151,790 | 5/1979 | Spirk | 99/305 X |
| 4,328,740 | 5/1982 | McDonough et al. | 99/285 X |
| 4,343,232 | 8/1982 | Corbier | 99/299 |
| 4,759,274 | 7/1988 | Schmidt | 99/285 X |
| 4,815,366 | 3/1989 | Hauslein | 99/305 X |
| 5,060,558 | 10/1991 | Beumer et al. | 99/306 |

OTHER PUBLICATIONS

Product brochure, Black and Decker, Spacemaker Drip Coffeemakers, Pub. No. 168638–12–RV01, copyright 1989, 1990, 1991, 1992, 1993.

Product brochure, Black and Decker, Spacemaker, Pub. No. 174580–00–RV00, copyright 1993–1998.

*Primary Examiner*—Reginald L. Alexander
*Attorney, Agent, or Firm*—Faegre & Benson LLP

[57] ABSTRACT

A single serving beverage maker with a removable water storage reservoir (with a sight glass) to hold multiples of a single serving of water, a water boiler reservoir to heat a single serving of water, an electric heater for heating the single serving of water in the water boiler reservoir, one or more valves between the water storage reservoir and the water boiler reservoir, a brewing compartment for holding a single serving of a material (which may be in a porous bag) to be infused into the water, and a support to closely interfit with and position a coffee cup subjacent the brewing compartment such that a succession of single servings of a heated beverage such as coffee may be individually brewed and served. The beverage maker may utilize the boiler reservoir as a measuring reservoir or alternatively, a separate measuring reservoir (also with a sight glass) may be provided between the water storage reservoir and the water boiler reservoir. A latching switch may be used to engage a solenoid to empty the separate measuring reservoir during a brew cycle.

20 Claims, 6 Drawing Sheets

6,164,191

SINGLE SERVING BEVERAGE MAKER

BACKGROUND OF THE INVENTION

The present invention relates to the field of electric beverage makers, particularly including coffee makers. In the past, such beverage makers were sized to brew multiple servings at once, often resulting in the brewed beverage becoming stale or bitter by the time it was consumed when only one person was present to consume the beverage. Alternatively, another approach was to brew a single serving directly in the cup from which the beverage was later consumed. This alternative approach resulted in a need or desire to dispose of the coffee grounds or tea bag before consumption and required some means to heat water in the cup. One such heater was an immersion heater which was then required to be removed from the cup and stored until the next use. Another approach was to place the cup in a microwave oven for heating, provided the cup was compatible with such an approach. Microwave heating resulted in unsatisfactory operation when the cup or mug was formed or coated with microwave absorptive material, since then even the handle became excessively hot and uncomfortable or dangerous to grasp.

The present invention overcomes such shortcomings of the prior art by providing a single serving beverage maker which enables successive delivery of fresh, single servings of a heated beverage by utilizing a multiple serving water storage reservoir in combination with a single serving measuring reservoir to dispense the successive single servings of the heated beverage.

DETAILED DESCRIPTION OF THE INVENTION

Figure 1:
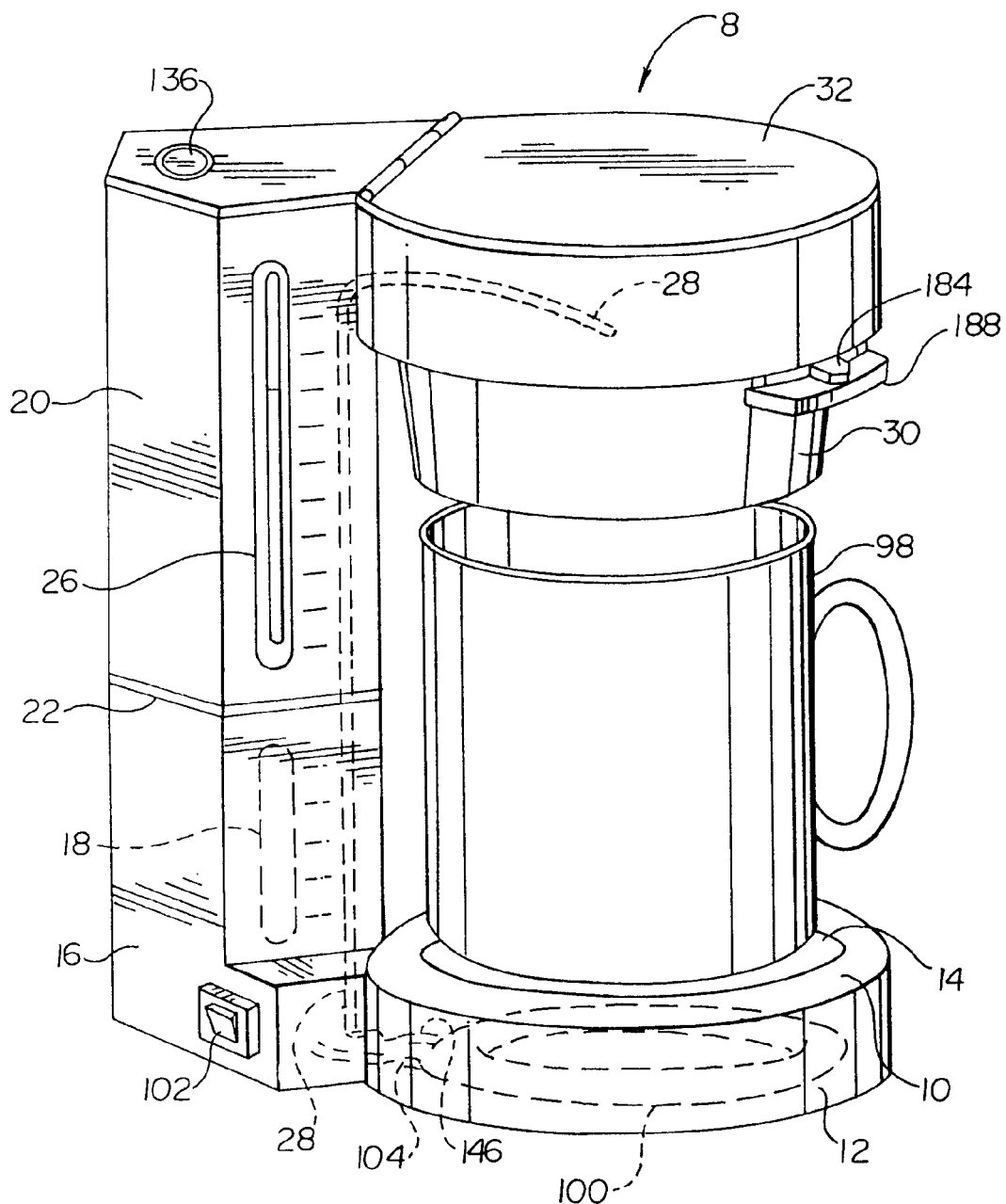
FIG. 1 is a perspective view of a first embodiment of a single serving beverage maker useful in the practice of the present invention.

Referring now to the Figures, and most particularly, to FIG. 1, a perspective view of a single serving beverage maker 8 may be seen. It is to be understood that beverage maker 8 is preferably designed for use in vehicles, particularly to operate from 12 Volts DC electrical power. Beverage maker 8 preferably includes a base housing 10, providing a support 12 for a single serving cup or mug 98. Support 12 preferably includes a recess or shallow depression 14 such that support 12 is sized to closely interfit and position the cup or mug 98 in alignment with a basket or brewing compartment 30. It is to be understood that the beverage maker 8 is sized throughout to only make or brew a single serving at a time. Beverage maker 8 also preferably includes a water storage reservoir 20 sufficient to hold multiples of a single serving of water. A glass sight tube 26 provides an indicating means for indicating how many servings of water remain in the water storage reservoir 20. A water boiler reservoir 100 has an inlet 104 connected to receive water from the water storage reservoir 20 and further has an outlet 146 connected to a passageway 28 to deliver hot water to the brewing compartment 30. After infusion with a flavoring in brewing compartment 30, the heated beverage is delivered to cup 98 which may be withdrawn from apparatus 8 for consumption of the single serving of the beverage. A hinged lid 32 may be opened to provide access to the water storage compartment 20 for filling. Alternatively, water storage compartment or reservoir 20 may be made removable for filling. In an alternative, preferred, embodiment (shown in FIG. 3), a measuring reservoir 16 is provided as a part of a water transfer means for selectively transferring a single serving of water upon demand from the water storage reservoir 20 to the water boiler reservoir 100. Measuring reservoir 16 is sized to hold at most a single serving of water, and may have a measuring reservoir sight glass 18 to enable observation of the absence or presence (and the volume) of water in the measuring reservoir at the time. In the embodiment having the measuring reservoir, a partition or wall 22 separates the reservoirs 20 and 16.

A push button 136 is preferably located on the top surface of beverage maker 8 and is available to transfer water from the water storage reservoir 20 to the measuring reservoir 16 and thence to water boiler reservoir 100 upon demand. If no separate measuring reservoir 16 is present, it is preferred that water boiler reservoir serve as the measuring reservoir by having a capacity of a single serving of water to measure the desired amount of water delivered from the storage reservoir 20. Another push button 102 may be provided to actuate the electric heater to boil the water. It is to be understood that with a separate measuring reservoir, the water boiler reservoir is preferably sized to have a capacity substantially smaller than a single serving, with the boiler successively heating a number of portions of water which together make up a single serving.

A tab 188 projects laterally from compartment 30 as a support and base for an arrow shaped extension 184 of a lever available for controlling the rate at which the beverage is dispensed from a brewing compartment to the mug or cup.

Figure 2:
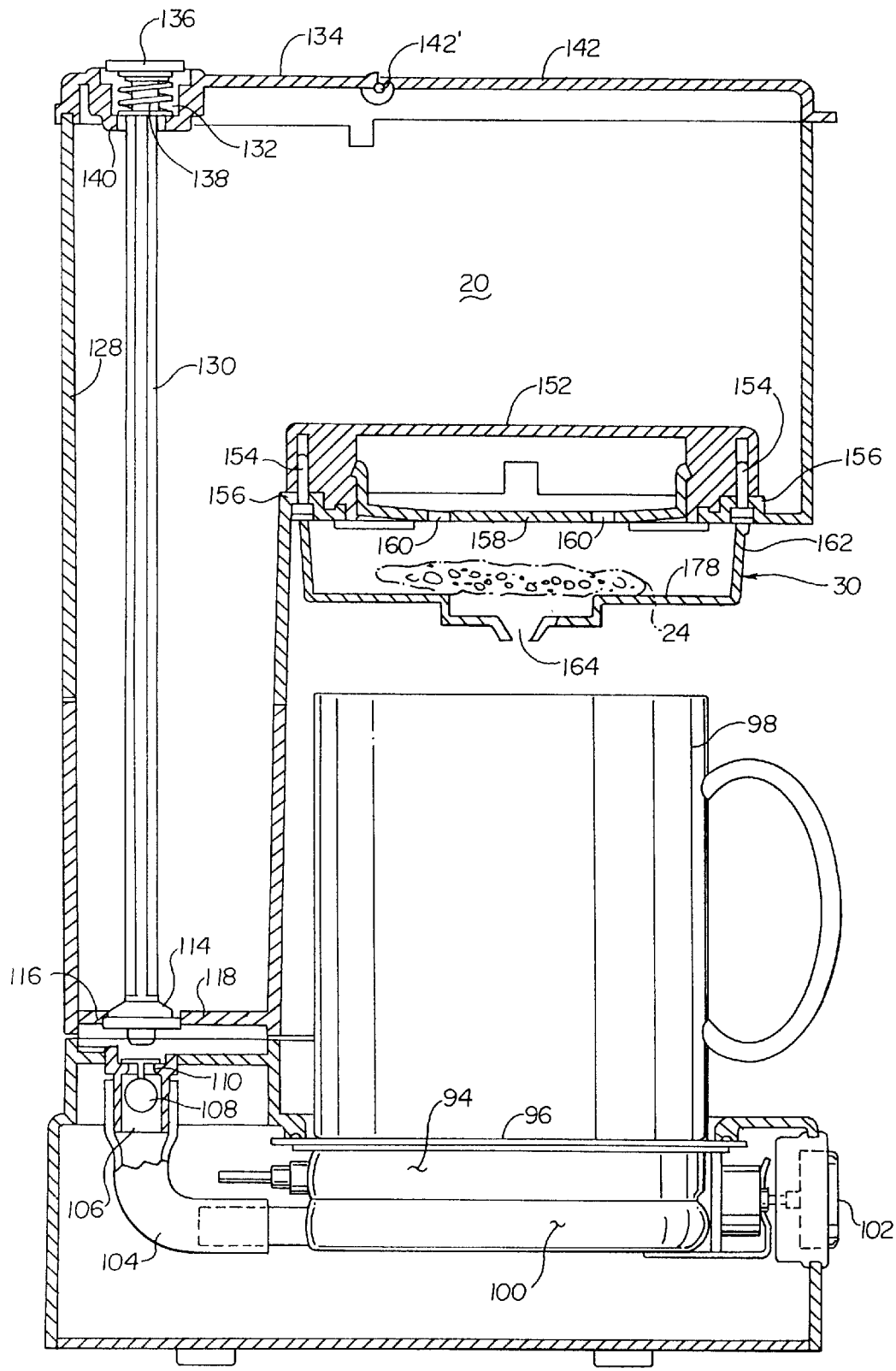
FIG. 2 is a section view of a second embodiment of a single serving beverage maker useful in the practice of the present invention illustrating certain internal details thereof.

Referring now also to FIG. 2, an embodiment without a separate measuring reservoir is shown. In this embodiment, the water boiler reservoir 100 serves as the measuring reservoir. Storage reservoir 20 is closed by lid 142 connected to a fixed portion 134 by a hinge 142'. Reservoir 20 has vertical walls 128. A pushrod 130 connects pushbutton 136 with a first valve 114 located between the water storage reservoir 20 and the inlet 104 of the water boiler reservoir 100. Valve 114 has a valve seat 116 in a lower wall 118. A spring 138 in a recess 132 acts to urge push button 136 away from wall 140, keeping valve 114 closed except when push button 136 is manually depressed.

A check valve assembly 106 is located in the inlet passageway 104 to boiler reservoir 100 and has a buoyant ball 108 and a seat 110 to prevent water from escaping from the water boiler reservoir 100 through the inlet passageway 104. An electric heater 94 is connected to switch 102.

Figure 4:
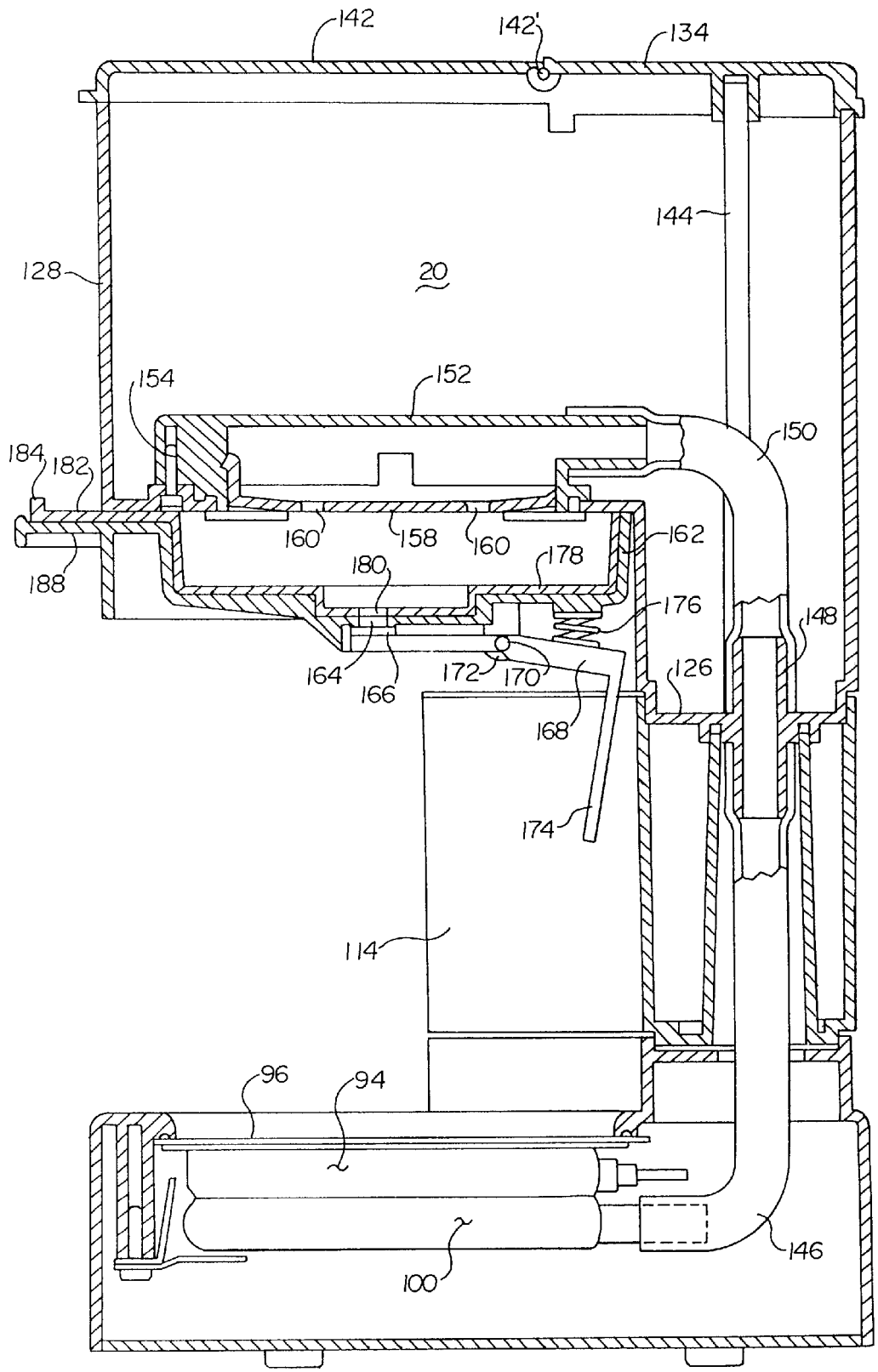
FIG. 4 is a section view from the opposite side of FIG. 3 illustrating further aspects of the present invention.

Referring now also to FIG. 4, the water boiler reservoir 100 connects through the outlet 146 and connector 148 to a water distributor housing 152. Housing 152 is secured by screws 154 to a peripheral flange 156 on the bottom of reservoir 20 and defines an enlarged opening within flange 156. A distributor plate 158 closes the bottom side of housing 152 and is provided with a plurality of openings 160 through which water is distributed to a support basket 162 of the brewing compartment 30. The basket may be used to retain ground coffee, tea or other beverage material in bulk or in bags. If the dry beverage material is provided in bulk form, it is preferably deposited in a filter placed in the support basket 162. Water delivered through openings 160 is retained temporarily for infusion of the flavor from the initially dry material into the water to form the consumable beverage. The infused water exits through discharge opening 164 into underlying cup 98. The amount of liquid beverage delivered to the cup 98 is a single serving, typically and preferably in the range of 6 to 10 ounces, which may be tailored to the specific capacity of the cup 98, but in any event is sized to not overfill or overflow cup 98.

A stopper 166 may be associated with opening 164 to control the dispensing of liquid to cup 98. The stopper 166 is preferably mounted on one end of an arm 168 pivoted intermediate its ends on a pivot 170, pivotably secured between tabs 172 extending downward from basket 162. An actuator blade 174 extends from arm 168 downward and is preferably engaged by cup 98 when the cup 98 is received on supporting upper surface 98 and located by depression 14. A spring 178 preferably urges stopper 166 against and closes opening 164 when no cup is present. When a cup 98 is present, the cup will move stopper 166 away from opening 164, permitting delivery of the beverage to the cup 98.

Figure 3:
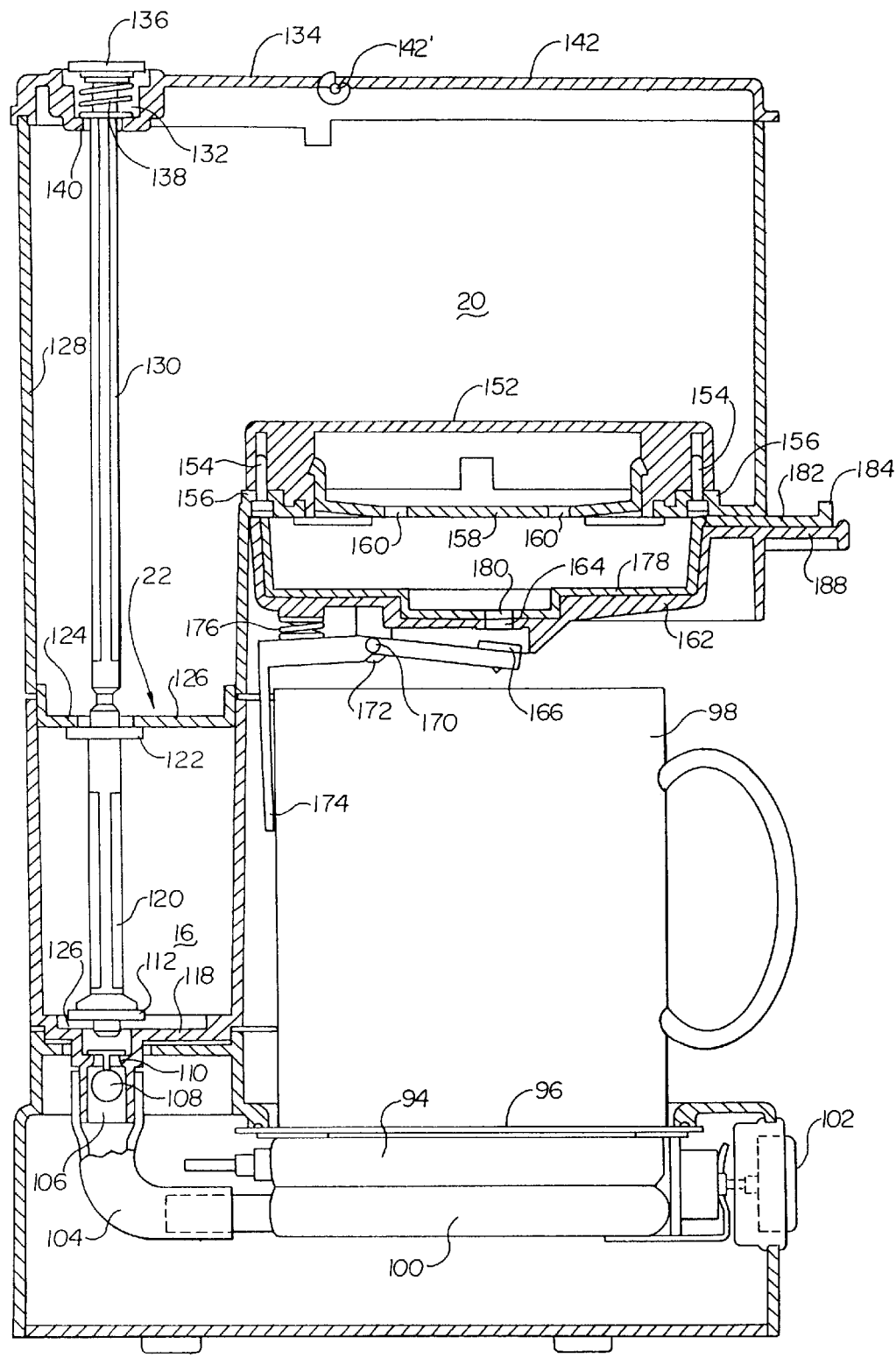
FIG. 3 is a section view of third embodiment of a single serving beverage maker useful in the practice of the present invention.
Figure 5:
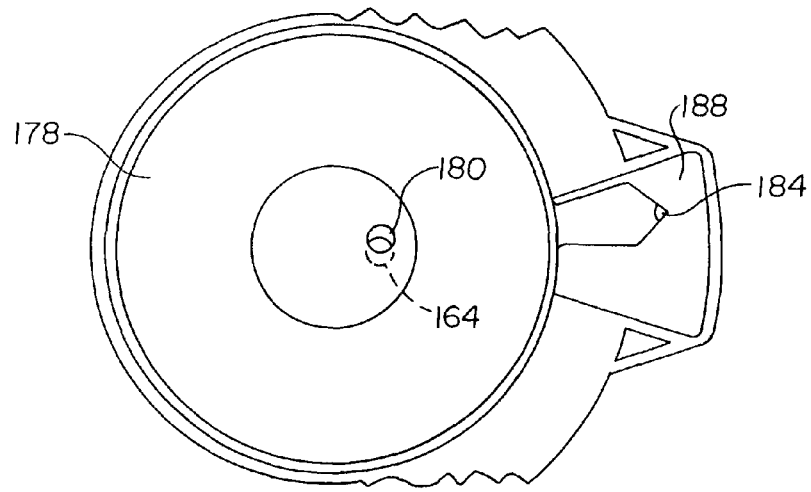
FIG. 5 is fragmentary plan view of an adjustable orifice mechanism at the outlet of the brewing compartment useful in the practice of the present invention.

Referring now to FIGS. 3, 4 and 5, an inner basket 178 is supported in support basket 162 for rotation therein and an opening 180 in basket 178 registers with opening 164 in basket 162. It is to be understood that the openings 180, 164 are offset slightly from the axis of rotation of basket 178 so that a slight rotation of basket 178 moves opening 180 relative to opening 164. As illustrated most clearly in FIG. 5, the openings 180, 164 may be adjustably offset from each other, forming an adjustable exit orifice to provide control of the liquid discharge rate from compartment 30. A laterally extending lever 182 on basket 178 terminates in the arrow-shaped extension 184 which registers with indicia 186 on tab 188 projecting laterally from basket 162. It is to be understood that the sub-assembly of support basket 162, inner basket 178, and the stopper mechanism 166–174 is preferably removable as a unit, for replacing used grounds and filter with fresh dry materials. Tab 188 may serve as a handle or grip for manipulating this sub-assembly, which may be retained in beverage maker in a conventional manner. It is to be further understood that a single basket 162 may be used as shown in FIG. 2 if adjustability of the outlet flow rate is not needed or desired.

Referring now most particularly to FIG. 3, an alternative embodiment may be seen in which a separate measuring reservoir 16 is present. In this embodiment, the water storage reservoir outlet valve 122 seals against valve seat 124 until button 136 is depressed. In the position shown, button 136 is not depressed, and a second valve 112 is spaced apart from a valve seat 126 in lower wall 118, which now is part of the measuring reservoir 16. In this embodiment, wall or partition 22 has a surface 126 extending from valve seat 124 to vertical walls 128. In the position shown, water is permitted to flow from measuring reservoir 16 into the boiler reservoir 100, and water is prevented from moving from the storage reservoir 20 to the measuring reservoir 16.

When it is desired to brew a single serving of beverage, button 136 is depressed, closing valve 112 and opening valve 122. At this time, water fills measuring reservoir 16, sized to contain only a single serving of water. Once measuring reservoir is filled, button 136 is released, closing valve 122 and opening valve 112, delivering the single serving of water from the measuring reservoir 16 to the boiler reservoir 100. It is to be understood that this release of button 132 may be manual or may be an automatically timed release using a conventional mechanism such as a dashpot and overcenter actuator. In this embodiment an extension 120 of pushrod 130 connects the second valve 112 to push button 136.

Figure 7:
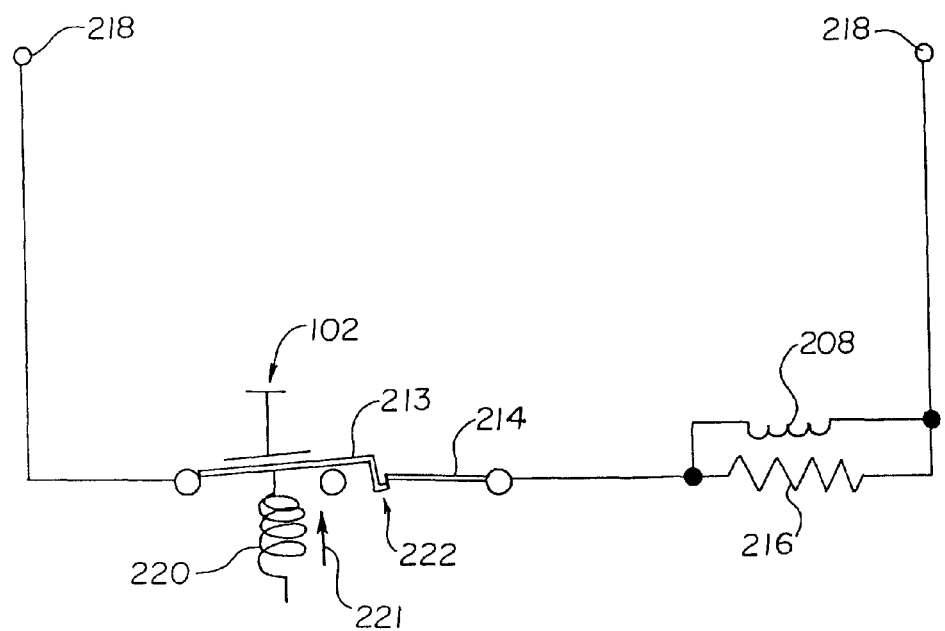
FIG. 7 is an electrical schematic of the beverage maker of FIG. 3.
Figure 6:
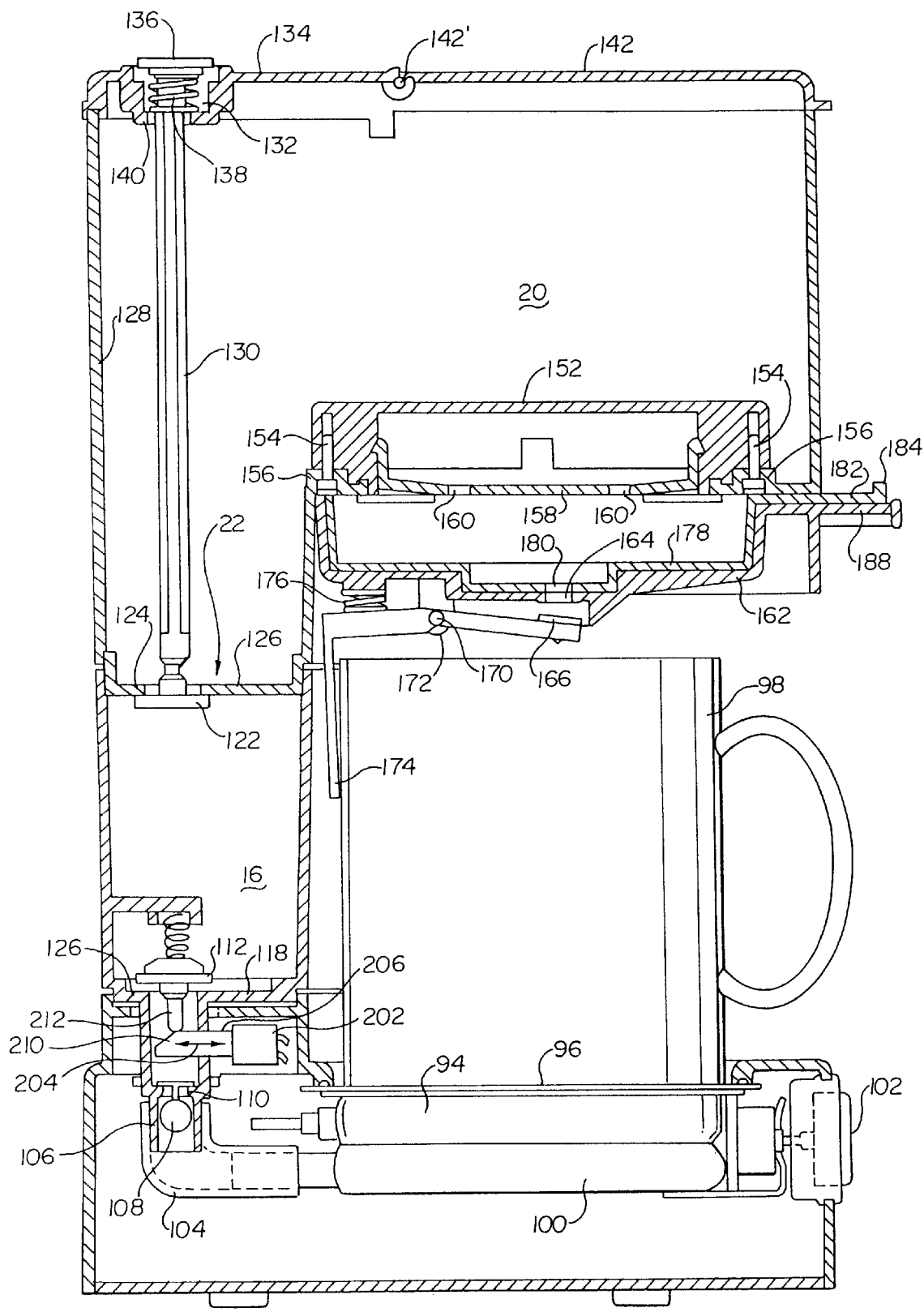
FIG. 6 is a section view similar to that of FIG. 3 for a still further embodiment of the present invention.

Referring now most particularly to FIGS. 6 and 7, a still further alternative embodiment of the beverage maker of the present invention may be seen. In this embodiment, pushrod 130 extends from push button 136 only to first valve 122. A electrically operated solenoid 202 has a core or plunger 206 movable in the directions of double-ended arrow 204, and a driving coil 208. When solenoid 202 is electrically energized, plunger 206 will drive to the left, opening valve 112 by urging it upward because of the action of cam surface 210 of plunger 206 acting against a cam follower 212 on valve member 112.

Switch 102 is preferably a normally-open type latching type switch having a contact 213 electrically and mechanically engaged with a bi-metal strip 214. Switch 102 also preferably has a return spring 220 urging contact 213 into the normally-open (open circuit) condition (in the direction of arrow 221) when the latching mechanism 222 releases contact 213. Contacts 218 are preferably connected to a source of electrical power suitable for energizing the beverage maker 8.

Electric heater 94 preferably has the bi-metal strip 214 in series with a resistance 216 used to heat water in the water boiler reservoir 100. When the boiler reservoir runs dry, the bi-metal strip will deform sufficiently to release switch 102.

In operation, if it is desired to brew one cup of coffee, for example, the desired amount of ground coffee is placed in the brewing reservoir, either with a conventional filter, or in a prefilled, porous bag 24, similar to a conventional teabag. Button 136 is depressed for a time sufficient to enable delivery of one serving of water to the boiler reservoir 100, (for the embodiment of FIG. 2) or sufficient to fill measuring reservoir 16 (for the embodiment of FIG. 3) at which time button 136 is released (either manually or automatically) and button 102 is depressed, energizing the heater to boil the water. When switch 120 is depressed, bi-metal strip 214 will latch contact 213 in a closed circuit condition, as shown in FIG. 7. Electrical energy will be applied to both the boiler element 216 and to the coil 208 of solenoid 202. In the embodiment shown in FIGS. 6 and 7, the measuring reservoir will then be opened to deliver water to the boiler reservoir 100. It is to be understood that with this embodiment, the boiler reservoir preferably has a capacity less than one serving, since the boiler reservoir will continue to be replenished with water from the measuring reservoir while valve 112 is held open. Once the measuring reservoir is emptied, the boiler 100 will have delivered a single serving (and only a single serving, since valve 122 will normally not be further actuated and thus will remain closed during the brewing cycle) of water to the distribution housing 152 and from there the water will enter the brewing compartment 30, where it will be infused with flavor from the dry material previously placed therein. The infused liquid (in the form of a heated beverage) will be delivered to the cup 98 at which time the cup 98 may be removed for consumption of the beverage.

This invention is not to be taken as limited to all of the details thereof as modifications and variations thereof may be made without departing from the spirit or scope of the invention.

What is claimed is:

1. A single serving beverage maker for brewing a beverage comprising:
   a. a water storage reservoir sufficient to hold multiples of a single serving of water and detachable from the beverage maker;
   b. a water boiler reservoir for heating water;
   c. an electric heater for heating the single serving of water in the water boiler reservoir;
   d. water transfer means including a measuring reservoir sized to hold at most a single serving of water and located intermediate the water storage reservoir and the water boiler reservoir for selectively transferring a single serving of water upon demand from the water storage reservoir to the water boiler reservoir; and
   e. a brewing compartment for holding a single serving of material to be infused into the water from the water boiler reservoir;
   such that the beverage maker selectively provides a succession of individual brewings of single servings of a beverage upon replacement of the material to be infused between servings.

2. The single serving beverage maker of claim 1 wherein the beverage is coffee.

3. The single serving beverage maker of claim 2 further comprising a porous bag containing a single serving portion of ground coffee beans.

4. The single serving beverage maker of claim 1 wherein the beverage is tea.

5. The single serving beverage maker of claim 1 wherein the beverage is a flavored hot drink.

6. The single serving beverage maker of claim 1 wherein the water storage reservoir includes indicating means for indicating how many servings of water remain in the water storage reservoir.

7. The single serving beverage maker of claim 6 wherein the indicating means includes a storage reservoir sight glass.

8. The single serving beverage maker of claim 1 wherein the water transfer means includes a valve located between the water storage reservoir and the water boiler reservoir.

9. The single serving beverage maker of claim 1 wherein the water storage reservoir has integrally formed supporting structure to maintain the water storage reservoir level when detached and placed on a horizontal plane surface.

10. The single serving beverage maker of claim 1 wherein the water transfer means further comprises means for selectively delivering less than a single serving of water to the measuring reservoir.

11. The single serving beverage maker of claim 1 wherein the water transfer means further comprises first valve means between the water storage reservoir and the measuring reservoir to selectively admit a single serving of water from the water storage reservoir to the measuring reservoir.

12. The single serving beverage maker of claim 10 wherein the water transfer means further comprises second valve means between the measuring reservoir and the water boiler reservoir for selectively transferring a single serving of water from the measuring reservoir to the water boiler reservoir.

13. The single serving beverage maker of claim 1 further comprising a solenoid-operated valve between the measuring reservoir and the boiler reservoir operable to empty the measuring reservoir during a brew cycle to deliver a single serving of water to the boiler reservoir.

14. A single serving beverage maker for brewing a beverage comprising:
   a. a water storage reservoir sufficient to hold multiples of a single serving of water;
   b. a water boiler reservoir for heating water;
   c. an electric heater for heating the single serving of water in the water boiler reservoir,
   d. water transfer means including a measuring reservoir sized to hold at most a single serving of water and located intermediate the water storage reservoir and the water boiler reservoir for selectively transferring one of:
      i) a single serving of water, and
      ii) less than a single serving of water upon demand from the water storage reservoir to the water boiler reservoir; and
   e. a brewing compartment for holding a single serving of material to be infused into the water from the water boiler reservoir;
   such that the beverage maker selectively provides a succession of individual brewings of up to at most respective single servings of a beverage upon replacement of the material to be infused between servings.

15. The single serving beverage maker of claim 14 wherein the water storage reservoir is detachable from the beverage maker.

16. The single serving beverage maker of claim 14 wherein the water transfer means further comprises first valve means between the water storage reservoir and the measuring reservoir to selectively admit a single serving of water from the water storage reservoir to the measuring reservoir.

17. The single serving beverage maker of claim 14 wherein the water transfer means further comprises second valve means between the measuring reservoir and the water boiler reservoir for selectively transferring a single serving of water from the measuring reservoir to the water boiler reservoir.

18. The single serving beverage maker of claim 17 further comprising a first valve means and wherein the second valve means is open when the first valve means is closed, and the second valve means is closed when the first valve means is open.

19. The single serving beverage maker of claim 14 further comprising a measuring reservoir sight glass to enable observation of the volume of water then present in the measuring reservoir.

20. The single serving beverage maker of claim 14 further comprising a solenoid-operated valve between the measuring reservoir and the boiler reservoir operable to empty the measuring reservoir during a brew cycle to deliver a single serving of water to the boiler reservoir.

* * * * *